United States Patent
Scudder (10) Patent No.: US 11,396,833 B2
(45) Date of Patent: Jul. 26, 2022

(54) OIL STORAGE AND FILTRATION SYSTEM

(71) Applicant: SAFRAN POWER UNITS, Toulouse (FR)

(72) Inventor: Mark Scudder, San Diego, CA (US)

(73) Assignee: SAFRAN POWER UNITS, Toulouse (FR)

( * ) Notice: Subject to any disclaimer, the term of this patent is extended or adjusted under 35 U.S.C. 154(b) by 215 days.

(21) Appl. No.: 16/751,383

(22) Filed: Jan. 24, 2020

(65) Prior Publication Data

US 2020/0240298 A1 Jul. 30, 2020

Related U.S. Application Data

(60) Provisional application No. 62/797,490, filed on Jan. 28, 2019.

(51) Int. Cl.
*F01M 11/04* (2006.01)
*B01D 35/00* (2006.01)
*B01D 35/157* (2006.01)
*B01D 35/16* (2006.01)
*F01M 11/00* (2006.01)
(Continued)

(52) U.S. Cl.
CPC ....... *F01M 11/0458* (2013.01); *B01D 35/005* (2013.01); *B01D 35/1573* (2013.01); *B01D 35/16* (2013.01); *F01M 11/0004* (2013.01); *F01M 11/03* (2013.01); *F01M 11/12* (2013.01); *F01M 2011/0029* (2013.01)

(58) Field of Classification Search
None
See application file for complete search history.

(56) References Cited

U.S. PATENT DOCUMENTS 1,585,025 A * 5/1926 Gorschalki ............. F02B 77/04
222/444
1,702,703 A * 2/1929 Osborne ............ F01M 11/0458
222/189.06
(Continued)

FOREIGN PATENT DOCUMENTS

| CA | 2279111 | 2/2001 | |
|---|---|---|---|
| WO | 97/12173 A1 | 4/1997 | |
| WO | WO-2020159808 A1 * | 8/2020 | ........... B01D 35/005 |

OTHER PUBLICATIONS

International Search Report and Written Opinion dated May 15, 2020, 15 pages.

*Primary Examiner* — Robert J Popovics
(74) *Attorney, Agent, or Firm* — Rankin, Hill & Clark LLP (57) ABSTRACT

An oil storage and filtration system for an engine unit includes an on/off valve that defines an operating phase when receiving supply air and in an on position and a standby phase when in an off position or not receiving the supply air. The system also includes a fill/drain valve that defines a drain state and a fill state which respectively correspond to emptying and filling oil from/into the engine unit. The system also includes a control valve, a pressure/vacuum valve, and a storage tank. The storage tank stores oil in a pressurized condition during the fill state, a vacuum condition during the drain state, and an atmospheric condition during the standby phase. The also includes a vacuum generator in fluid communication with the storage tank during the drain state and fluidly isolated from the storage tank during the fill state.

6 Claims, 4 Drawing Sheets

(51) Int. Cl.
*F01M 11/03* (2006.01)
*F01M 11/12* (2006.01)

(56) References Cited

U.S. PATENT DOCUMENTS

| | | | | | |
|---|---|---|---|---|---|
| 1,721,444 | A * | 7/1929 | Habel | ............... | B08B 9/093 123/41.55 |
| 1,829,173 | A * | 10/1931 | Wertz | ............... | F01M 11/0458 222/17 |
| 1,955,199 | A * | 4/1934 | Menge | ............... | F16N 13/00 134/107 |
| 1,962,463 | A * | 6/1934 | Renfrew | ............... | C10M 175/00 184/6.24 |
| 2,029,232 | A * | 1/1936 | Green | ............... | F01P 11/06 165/95 |
| 2,222,516 | A * | 11/1940 | Powell | ............... | F01P 11/06 134/201 |
| 2,300,450 | A * | 11/1942 | Saussure | ............... | F01M 11/0458 134/107 |
| 2,425,848 | A * | 8/1947 | Vawter | ............... | B01D 25/00 134/107 |
| 2,435,832 | A * | 2/1948 | Harvuot | ............... | F16N 39/06 184/7.3 |
| 2,477,450 | A * | 7/1949 | Gray | ............... | F01M 11/0458 184/1.5 |
| 2,499,705 | A * | 3/1950 | Vokes | ............... | F01M 11/04 210/167.04 |
| 2,510,701 | A * | 6/1950 | La Cross | ............... | B08B 9/0323 134/17 |
| 2,635,756 | A * | 4/1953 | Grieve | ............... | B25B 27/0042 210/95 |
| 2,661,869 | A * | 12/1953 | Simpson | ............... | F01M 11/0458 222/626 |
| 2,685,347 | A * | 8/1954 | Busby | ............... | F16N 33/00 134/40 |
| 2,738,877 | A * | 3/1956 | Beach | ............... | B01D 17/00 210/182 |
| 2,835,261 | A * | 5/1958 | Wogan | ............... | B08B 9/0321 134/95.1 |
| 3,012,676 | A * | 12/1961 | Englesberg | ............... | E04H 4/12 D23/209 |
| 3,095,062 | A * | 6/1963 | Neely | ............... | F01M 11/0458 340/687 |
| 3,115,145 | A * | 12/1963 | Monteath, Jr. | ............... | C23G 3/00 134/107 |
| 3,394,812 | A * | 7/1968 | Cohen | ............... | B64F 1/36 210/241 |
| 3,431,145 | A * | 3/1969 | Riley | ............... | F02B 77/04 134/169 R |
| 3,473,662 | A * | 10/1969 | Kudlaty | ............... | B01D 37/04 210/100 |
| 3,489,245 | A * | 1/1970 | Broadwell | ............... | F02B 77/04 210/90 |
| 3,759,388 | A * | 9/1973 | Thomason | ............... | B01D 29/072 210/DIG. 8 |
| 3,810,487 | A * | 5/1974 | Cable | ............... | B60P 3/14 296/24.32 |
| 3,867,999 | A * | 2/1975 | Cox | ............... | F01M 11/0458 137/234.6 |
| 3,907,681 | A * | 9/1975 | Corrigan | ............... | B01D 29/6415 210/108 |
| 3,954,611 | A * | 5/1976 | Reedy | ............... | F16N 39/00 210/182 |
| 4,015,613 | A * | 4/1977 | Papworth | ............... | B08B 9/093 134/168 R |
| 4,059,123 | A * | 11/1977 | Bartos | ............... | B08B 3/026 134/102.2 |
| 4,095,673 | A * | 6/1978 | Takeuchi | ............... | B67D 7/845 184/106 |
| 4,109,703 | A * | 8/1978 | Babish | ............... | F02B 77/04 134/102.1 |
| 4,109,831 | A * | 8/1978 | Culpepper | ............... | F01M 11/0458 222/254 |
| 4,127,160 | A * | 11/1978 | Joffe | ............... | F01P 11/06 165/95 |
| 4,128,140 | A * | 12/1978 | Riches | ............... | F16N 27/00 184/1.5 |
| 4,153,553 | A * | 5/1979 | Davis | ............... | B01D 17/00 210/167.3 |
| 4,179,019 | A * | 12/1979 | Danziger | ............... | C10G 31/09 208/182 |
| 4,240,523 | A * | 12/1980 | Nestor | ............... | F01M 11/0458 251/98 |
| 4,276,914 | A * | 7/1981 | Albertson | ............... | B08B 9/035 417/403 |
| 4,360,436 | A * | 11/1982 | Poveromo | ............... | C10M 175/00 210/241 |
| 4,445,168 | A * | 4/1984 | Petryszyn | ............... | F16N 29/04 184/6.14 |
| 4,502,373 | A * | 3/1985 | Keating | ............... | A47J 37/1223 210/167.28 |
| 4,534,869 | A * | 8/1985 | Seibert | ............... | B01D 36/04 210/259 |
| 4,591,434 | A * | 5/1986 | Prudhomme | ............... | B01D 29/072 210/DIG. 8 |
| 4,606,363 | A * | 8/1986 | Scales | ............... | B60S 3/00 134/113 |
| 4,681,660 | A * | 7/1987 | Budny | ............... | B01D 3/10 208/185 |
| 4,702,827 | A * | 10/1987 | Wenzel | ............... | A47J 37/1223 210/DIG. 8 |
| 4,772,402 | A * | 9/1988 | Love | ............... | B01D 36/02 210/313 |
| 4,787,348 | A * | 11/1988 | Taylor | ............... | F02M 65/007 134/123 |
| 4,791,890 | A * | 12/1988 | Miles | ............... | F01P 11/06 123/41.14 |
| 4,804,005 | A * | 2/1989 | Hartopp | ............... | F02M 65/008 134/57 R |
| 4,836,921 | A * | 6/1989 | Hahn | ............... | C02F 1/5281 210/208 |
| 4,840,223 | A * | 6/1989 | Lee | ............... | F01P 11/06 165/95 |
| 4,872,997 | A * | 10/1989 | Becker | ............... | B01D 17/0205 210/171 |
| 4,877,043 | A * | 10/1989 | Carmichael | ............... | F02B 77/04 134/57 R |
| 4,901,786 | A * | 2/1990 | Vataru | ............... | F01P 11/06 165/95 |
| 4,959,144 | A * | 9/1990 | Bernard | ............... | B01D 29/608 210/DIG. 8 |
| 4,991,608 | A * | 2/1991 | Schweiger | ............... | F28G 9/00 134/102.2 |
| 5,015,301 | A * | 5/1991 | Baylor | ............... | B60S 5/00 134/22.12 |
| 5,026,488 | A * | 6/1991 | Mesheau | ............... | B01D 17/10 210/799 |
| 5,029,602 | A * | 7/1991 | McKinney | ............... | G05D 9/12 280/47.2 |
| 5,035,811 | A * | 7/1991 | Grondin | ............... | B01D 29/114 210/806 |
| 5,062,500 | A * | 11/1991 | Miller | ............... | F01M 11/0458 184/106 |
| 5,075,002 | A * | 12/1991 | Thalmann | ............... | B01D 61/22 210/257.2 |
| 5,076,856 | A * | 12/1991 | Schweiger | ............... | F28G 9/00 134/22.12 |
| 5,091,085 | A * | 2/1992 | Thalmann | ............... | B01D 17/02 210/321.65 |
| 5,098,580 | A * | 3/1992 | Andersen | ............... | B67D 7/76 137/15.16 |
| 5,104,529 | A * | 4/1992 | Becker | ............... | B01D 17/0202 210/474 |
| 5,160,444 | A * | 11/1992 | McFarland | ............... | B01D 29/606 210/DIG. 8 |
| 5,174,902 | A * | 12/1992 | Shubert | ............... | F01P 11/06 210/668 |
| 5,190,120 | A * | 3/1993 | Watts | ............... | F01M 11/03 134/22.12 |

(56) References Cited

U.S. PATENT DOCUMENTS

| | | | | |
|---|---|---|---|---|
| 5,228,985 A * | 7/1993 | Wells | | B01D 36/02 210/DIG. 8 |
| 5,232,513 A * | 8/1993 | Suratt | | F02B 77/04 134/21 |
| 5,238,085 A * | 8/1993 | Engelmann | | F01M 11/12 123/196 S |
| 5,242,032 A * | 9/1993 | Prestwood | | F01M 11/0458 184/106 |
| 5,249,511 A * | 10/1993 | Shumate | | B01D 29/23 210/DIG. 8 |
| 5,277,827 A * | 1/1994 | Osborne | | C10M 175/0058 210/167.04 |
| 5,289,837 A * | 3/1994 | Betancourt | | F02M 25/00 134/57 R |
| 5,318,080 A * | 6/1994 | Viken | | F01M 11/04 220/571 |
| 5,318,700 A * | 6/1994 | Dixon | | F01P 11/06 210/167.01 |
| 5,330,636 A * | 7/1994 | Reichert | | B01D 37/00 210/167.04 |
| 5,332,064 A * | 7/1994 | Liu | | F04D 13/08 184/31 |
| 5,370,160 A * | 12/1994 | Parker | | F16H 57/0408 134/169 C |
| 5,381,874 A * | 1/1995 | Hadank | | F16N 29/02 184/6 |
| 5,390,636 A * | 2/1995 | Baylor | | F02B 77/04 134/22.12 |
| 5,395,514 A * | 3/1995 | Siegler | | B01D 61/22 417/89 |
| 5,413,716 A * | 5/1995 | Osborne | | C10M 175/0058 210/167.04 |
| 5,417,851 A * | 5/1995 | Yee | | B01D 29/96 210/167.01 |
| 5,460,656 A * | 10/1995 | Waelput | | F02B 77/04 210/167.04 |
| 5,476,154 A * | 12/1995 | Sage | | F01M 11/0458 184/57 |
| 5,482,062 A * | 1/1996 | Chen | | B08B 3/04 134/169 R |
| 5,535,849 A * | 7/1996 | Few | | F16H 57/0408 141/94 |
| 5,554,278 A * | 9/1996 | Henderson | | F02M 25/00 210/171 |
| 5,566,781 A * | 10/1996 | Robert | | F16N 33/00 134/22.12 |
| 5,597,601 A * | 1/1997 | Griffin | | A47J 37/1223 210/DIG. 8 |
| 5,617,777 A * | 4/1997 | Davis | | A47J 37/1223 210/DIG. 8 |
| 5,626,170 A * | 5/1997 | Parker | | F02B 77/04 134/169 C |
| 5,669,464 A * | 9/1997 | Earleson | | F01M 1/12 123/196 S |
| 5,702,607 A * | 12/1997 | Lawson | | B01D 29/27 210/489 |
| 5,720,874 A * | 2/1998 | Siegler | | B01D 61/145 210/85 |
| 5,743,357 A * | 4/1998 | Few | | F01M 11/0458 141/98 |
| 5,772,871 A * | 6/1998 | Lyon | | B01D 17/12 210/DIG. 5 |
| 5,853,068 A * | 12/1998 | Dixon | | F01M 11/045 141/331 |
| 5,858,070 A * | 1/1999 | Halm | | B01D 19/0068 96/171 |
| 5,900,155 A * | 5/1999 | Bedi | | F01M 11/0458 184/6.24 |
| 5,915,499 A * | 6/1999 | Few | | F16H 57/0408 141/98 |
| 5,918,647 A * | 7/1999 | Liaw | | F01M 11/0458 141/98 |
| 5,948,274 A * | 9/1999 | Lyon | | B01D 17/045 210/776 |
| 5,951,857 A * | 9/1999 | Osborne | | B01D 29/52 244/114 R |
| 5,964,258 A * | 10/1999 | Schoenbauer | | B60P 3/228 141/83 |
| D420,720 S * | 2/2000 | Teran | | D23/200 |
| 6,041,798 A * | 3/2000 | Grigorian | | F01M 11/0408 134/169 A |
| 6,062,275 A * | 5/2000 | Rome | | F16H 57/0408 141/192 |
| 6,065,567 A * | 5/2000 | Camacho | | F02B 77/04 141/98 |
| 6,071,355 A * | 6/2000 | Suratt | | F02B 77/04 134/22.12 |
| 6,073,666 A * | 6/2000 | Clark, II | | F01M 11/0458 141/94 |
| 6,131,701 A * | 10/2000 | Camacho | | F02B 77/04 137/240 |
| 6,138,722 A * | 10/2000 | Willingham | | F01M 11/0458 141/98 |
| 6,170,505 B1 * | 1/2001 | Erwin | | F01M 11/0458 137/565.17 |
| 6,179,018 B1 * | 1/2001 | Erwin | | F16H 57/0408 141/98 |
| 6,193,895 B1 * | 2/2001 | Dea | | F01P 11/06 210/765 |
| 6,207,051 B1 * | 3/2001 | Anderson | | B01D 46/2411 210/241 |
| 6,213,133 B1 * | 4/2001 | Reicks | | F28G 9/00 134/22.12 |
| 6,227,332 B1 * | 5/2001 | Liao | | F01M 11/0458 141/86 |
| 6,244,384 B1 * | 6/2001 | Few | | F16H 57/0408 184/106 |
| 6,247,325 B1 * | 6/2001 | Muston | | F25B 45/00 62/149 |
| 6,247,509 B1 * | 6/2001 | Rome | | F16H 57/0408 141/192 |
| 6,253,805 B1 * | 7/2001 | Erwin | | F01M 11/0458 141/59 |
| 6,254,790 B1 * | 7/2001 | King | | A47J 37/1223 210/767 |
| 6,263,889 B1 * | 7/2001 | Flynn | | F02B 77/04 134/102.2 |
| 6,273,031 B1 * | 8/2001 | Verdegan | | F01M 11/0458 123/1 A |
| 6,302,167 B1 * | 10/2001 | Hollub | | B60T 17/221 141/98 |
| 6,305,393 B1 * | 10/2001 | Lin | | B08B 9/0325 134/169 R |
| 6,309,169 B1 * | 10/2001 | Carlile | | B65D 90/14 414/812 |
| 6,378,657 B2 * | 4/2002 | Viken | | F01M 11/0458 184/106 |
| 6,379,540 B2 * | 4/2002 | Reicks | | B08B 9/0328 165/95 |
| 6,447,573 B1 * | 9/2002 | Rake | | F16N 39/005 96/417 |
| 6,485,634 B2 * | 11/2002 | Warren | | B03C 1/12 210/85 |
| 6,539,958 B1 * | 4/2003 | Betancourt | | F01P 11/06 134/102.2 |
| 6,596,174 B1 * | 7/2003 | Marcus | | B67D 7/766 210/764 |
| 6,615,866 B2 * | 9/2003 | Cook | | F15B 21/008 137/565.33 |
| 6,752,159 B1 * | 6/2004 | Kavadeles | | B08B 9/0321 134/22.12 |
| D493,593 S * | 7/2004 | Anderson | | D34/14 |
| 6,761,135 B1 * | 7/2004 | Becktold | | B08B 3/026 237/19 |
| 6,779,633 B2 * | 8/2004 | Viken | | F01M 11/04 141/94 |
| 6,783,685 B2 * | 8/2004 | Hwang | | B01J 20/14 210/781 |

(56) References Cited

U.S. PATENT DOCUMENTS

| | | | |
|---|---|---|---|
| 6,796,339 B1* | 9/2004 | Petty | B60T 17/222 141/69 |
| 6,863,827 B2* | 3/2005 | Saraceno | C02F 9/005 210/85 |
| 6,883,526 B1* | 4/2005 | Betancourt | F01P 11/06 134/10 |
| 6,886,664 B2* | 5/2005 | Erwin | F01M 11/0458 184/7.4 |
| 6,923,190 B1* | 8/2005 | Kavadeles | F01M 11/0458 134/113 |
| 6,932,856 B2* | 8/2005 | Rake | F16N 39/005 96/111 |
| 6,972,089 B2* | 12/2005 | Leathers | B01D 61/14 210/241 |
| 6,979,397 B2* | 12/2005 | Evanovich | B01D 35/143 210/171 |
| 6,986,849 B2* | 1/2006 | Irvine | B01D 29/904 210/791 |
| 7,017,712 B1* | 3/2006 | Rake | F16N 39/005 184/6.4 |
| 7,033,513 B2* | 4/2006 | Riggins | B01D 36/003 210/167.04 |
| D520,595 S* | 5/2006 | Johnson | D23/207 |
| D521,593 S* | 5/2006 | Mitsis | D23/207 |
| 7,056,442 B2* | 6/2006 | Hansen | F01P 11/06 134/22.12 |
| 7,150,286 B2* | 12/2006 | Apostolides | F15B 21/005 137/565.33 |
| 7,163,085 B1* | 1/2007 | Bedi | F01M 11/04 184/1.5 |
| 7,179,390 B1* | 2/2007 | Layton | B01D 36/00 210/248 |
| 7,191,786 B2* | 3/2007 | Awad | B09B 2101/02 184/6 |
| 7,223,337 B1* | 5/2007 | Franzino | B08B 9/08 210/241 |
| 7,282,156 B2* | 10/2007 | Franzino | F28F 25/00 210/241 |
| 7,303,672 B2* | 12/2007 | Irvine | B01D 29/96 210/255 |
| 7,305,998 B2* | 12/2007 | Watt | B08B 9/0321 134/29 |
| 7,354,511 B2* | 4/2008 | Becker | F15B 21/041 210/172.6 |
| 7,368,054 B2* | 5/2008 | Porter | B01D 21/0012 210/167.01 |
| D577,415 S* | 9/2008 | Reid | D23/209 |
| 7,431,039 B2* | 10/2008 | Chu | B08B 9/0321 210/195.1 |
| 7,438,820 B1* | 10/2008 | Sanchez | C02F 9/005 210/95 |
| 7,455,784 B2* | 11/2008 | Irvine | B01D 29/445 210/791 |
| 7,473,352 B2* | 1/2009 | Sundeng | B67D 7/76 210/DIG. 5 |
| 7,510,662 B1* | 3/2009 | Hansen | F01P 11/06 134/22.12 |
| 7,537,691 B2* | 5/2009 | Reid | E04H 4/1636 210/416.2 |
| 7,546,842 B2* | 6/2009 | Llorente Gonzalez | F01M 11/04 134/116 |
| 7,674,387 B2* | 3/2010 | Schmidt | F16N 7/38 210/167.07 |
| 7,799,231 B2* | 9/2010 | Irvine | B01D 21/0009 210/791 |
| 7,846,342 B2* | 12/2010 | Johnson | B01D 61/24 184/6.24 |
| 7,849,680 B2* | 12/2010 | Shaft | B60R 13/0884 123/319 |
| 7,938,959 B1* | 5/2011 | Inman | A47J 37/1233 210/DIG. 8 |
| 7,993,530 B2* | 8/2011 | Horne | B01D 35/26 210/171 |
| 8,147,683 B2* | 4/2012 | Wilson | B01D 35/143 210/90 |
| 8,147,684 B2* | 4/2012 | Wilson | B01D 35/26 184/6.24 |
| 8,153,001 B2* | 4/2012 | Peters | B01D 29/27 210/406 |
| 8,241,010 B2* | 8/2012 | Esch | F04B 23/02 417/237 |
| 8,246,840 B1* | 8/2012 | Blundy | F02M 37/42 141/69 |
| 8,268,179 B2* | 9/2012 | Peters | B01D 29/27 210/406 |
| 8,590,580 B2* | 11/2013 | Bedi | F01P 11/0204 141/98 |
| 8,636,903 B2* | 1/2014 | Evanovich | B01D 35/303 210/240 |
| 8,845,898 B2* | 9/2014 | DeDe | B64D 41/00 210/450 |
| 8,926,837 B1* | 1/2015 | Shumate | A47J 37/1223 210/DIG. 8 |
| 8,926,847 B1* | 1/2015 | Schade | B01D 21/2405 210/167.01 |
| 8,980,102 B2* | 3/2015 | Florkey | A23D 9/06 99/410 |
| 8,992,773 B2* | 3/2015 | Marheine | B01D 35/26 210/167.28 |
| 9,140,194 B2* | 9/2015 | Ertz | F01D 25/18 |
| 9,353,642 B2* | 5/2016 | Certain | F01D 13/003 |
| 9,820,613 B2* | 11/2017 | Palazzo | A47J 37/1285 |
| 9,835,241 B2* | 12/2017 | Aldridge | F16H 57/0402 |
| 10,161,499 B2* | 12/2018 | Aldridge | F16H 57/0402 |
| 10,266,276 B2* | 4/2019 | Beuning | B64D 41/00 |
| 10,363,907 B2* | 7/2019 | Erwin | B67D 7/221 |
| 10,376,101 B2* | 8/2019 | Coco | A47J 37/1223 |
| 10,463,197 B2* | 11/2019 | Coco | A47J 37/1223 |
| 10,497,531 B2* | 12/2019 | Bedi | F01P 11/0276 |
| 11,064,599 B1* | 7/2021 | Khalilzad-Sharghi | H05G 1/025 |
| 11,143,215 B2* | 10/2021 | Schaber | F15B 21/041 |
| 2003/0070849 A1* | 4/2003 | Whittaker | F02B 63/00 180/68.2 |
| 2004/0035805 A1* | 2/2004 | Hansen | F01P 11/06 210/791 |
| 2004/0169374 A1* | 9/2004 | Wurtele | B60H 1/00378 290/1 A |
| 2004/0211470 A1* | 10/2004 | Apostolides | F01M 11/0458 137/565.11 |
| 2004/0256332 A1* | 12/2004 | Riggins | B01D 36/003 210/167.01 |
| 2005/0145548 A1* | 7/2005 | Rhoades | B01D 61/04 422/62 |
| 2006/0032801 A1* | 2/2006 | Reid | E04H 4/1636 210/167.13 |
| 2006/0162751 A1* | 7/2006 | Llorente Gonzalez | F16H 57/04 134/169 R |
| 2006/0226058 A1* | 10/2006 | Porter | B01D 21/0012 210/259 |
| 2007/0007192 A1* | 1/2007 | Reid | E04H 4/1636 210/269 |
| 2007/0012375 A1* | 1/2007 | Fannon | B67D 7/02 141/67 |
| 2007/0045203 A1* | 3/2007 | Franzino | F28F 25/00 210/805 |
| 2007/0075005 A1* | 4/2007 | Haworth | B01D 35/26 210/416.1 |
| 2007/0119789 A1* | 5/2007 | Layton | B01D 36/00 210/167.02 |
| 2007/0266679 A1* | 11/2007 | Horne | B01D 35/26 55/356 |
| 2008/0023965 A1* | 1/2008 | Cagliari | B60H 1/3222 290/1 R |
| 2009/0136387 A1* | 5/2009 | Picton | B60R 13/0884 422/112 |

(56) References Cited

U.S. PATENT DOCUMENTS

| | | | |
|---|---|---|---|
| 2010/0133206 A1* | 6/2010 | Schade | B01D 21/2427 |
| | | | 210/232 |
| 2011/0062091 A1* | 3/2011 | Peters | B01D 29/27 |
| | | | 210/406 |
| 2011/0180492 A1* | 7/2011 | Wilson | B01D 35/1475 |
| | | | 210/136 |
| 2011/0186096 A1* | 8/2011 | Nordlund | H02K 7/1823 |
| | | | 134/198 |
| 2012/0006151 A1* | 1/2012 | DeDe | F02C 7/32 |
| | | | 210/450 |
| 2012/0118389 A1* | 5/2012 | Bedi | F01P 11/0204 |
| | | | 137/565.23 |
| 2012/0193304 A1* | 8/2012 | Peters | B01D 29/27 |
| | | | 210/767 |
| 2013/0233403 A1* | 9/2013 | Bedi | F01P 11/0204 |
| | | | 137/15.01 |
| 2014/0060589 A1* | 3/2014 | Nordlund | B64F 5/30 |
| | | | 307/151 |
| 2018/0347420 A1* | 12/2018 | Bedi | F01M 11/0458 |
| 2020/0105491 A1* | 4/2020 | Bedi | F15D 1/00 |
| 2020/0240298 A1* | 7/2020 | Scudder | F16N 31/00 |
| 2021/0095585 A1* | 4/2021 | Schiefer | F02M 37/44 |
| 2021/0362078 A1* | 11/2021 | De Los Reyes, III | |
| | | | B01D 29/114 |

\* cited by examiner

OIL STORAGE AND FILTRATION SYSTEM

BACKGROUND

An auxiliary power unit (APU) is a device on a vehicle that provides energy for functions other than propulsion. APUs are commonly found on large aircraft to provide electrical energy. For example, an aircraft APU can produce 115V alternating current (AC) at 400 Hz to run the electrical systems of the aircraft.

As will be appreciated, an APU is a type of engine unit. Thus, engine units comprise APUs and other types of power producing devices. As will also be appreciated, an engine unit is typically tested before installation onto the aircraft. For example, the engine unit may be tested after initial production and prior to delivery to the assembler of the aircraft. This test includes the measurement of various parameters during operation. Thus, the engine unit must be filled with a variety of fluids, including for example, oil for said test operation. However, the engine unit is not delivered to the assembler of the aircraft with fluids. As such, the engine unit must be drained of all fluids before delivery.

Disposing the fluid that was in the engine unit during testing is not cost effective, nor is it environmentally desirable. Accordingly, a better system and method to deal with this situation is needed.

SUMMARY

In view of the foregoing, an oil storage and filtration system for an engine unit includes an on/off valve that selectively receives supply air. The on/off valve defines an operating phase when receiving the supply air and in an on position and a standby phase when in an off position or not receiving the supply air. The oil storage and filtration system also includes a fill/drain valve that receives the supply air from the on/off valve during the operating phase. During the operating phase, the fill/drain valve defines a drain state and a fill state which respectively correspond to emptying and filling oil from/into the engine unit. The oil storage and filtration system also includes a control valve that receives the supply air from the on/off valve during the operating phase, a pressure/vacuum valve in fluid communication with the control valve, and a storage tank in fluid communication with the pressure/vacuum valve. The storage tank is configured to store oil in three conditions. The three conditions include a pressurized condition during the fill state, a vacuum condition during the drain state, and an atmospheric condition during the standby phase. The oil storage and filtration system also includes a vacuum generator in selective fluid communication with the control valve. The vacuum generator is in fluid communication with the storage tank during the drain state and fluidly isolated from the storage tank during the fill state.

According to an aspect, a method of processing oil from an engine unit includes fluidly connecting an oil storage and filtration system to supply air, selectively providing the supply air to the oil storage and filtration system, and fluidly connecting the oil storage and filtration system to the engine unit so that the oil storage and filtration system is selectively removable from the engine unit. The method also includes depressurizing a storage tank of the oil storage and filtration system to transfer the oil from the engine unit to the storage tank through a storage tank intake line, storing the oil in the storage tank of the oil storage and filtration system, and pressurizing the storage tank of the oil storage and filtration system to transfer the oil from the storage tank through a storage tank exhaust line to the engine unit.

DETAILED DESCRIPTION

Figure 1:
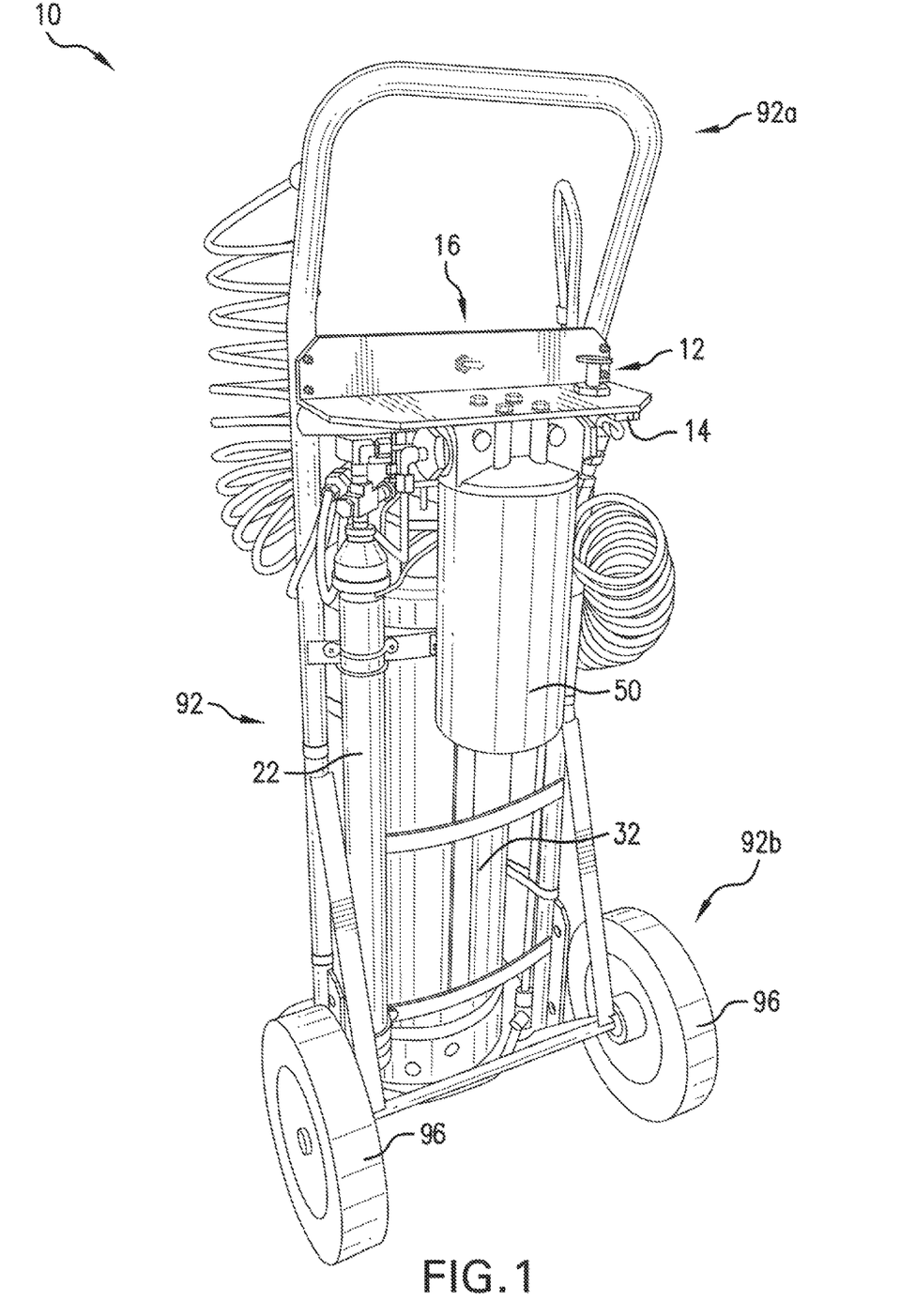
FIG. 1 is rear perspective view of an oil storage and filtration system.
Figure 2:
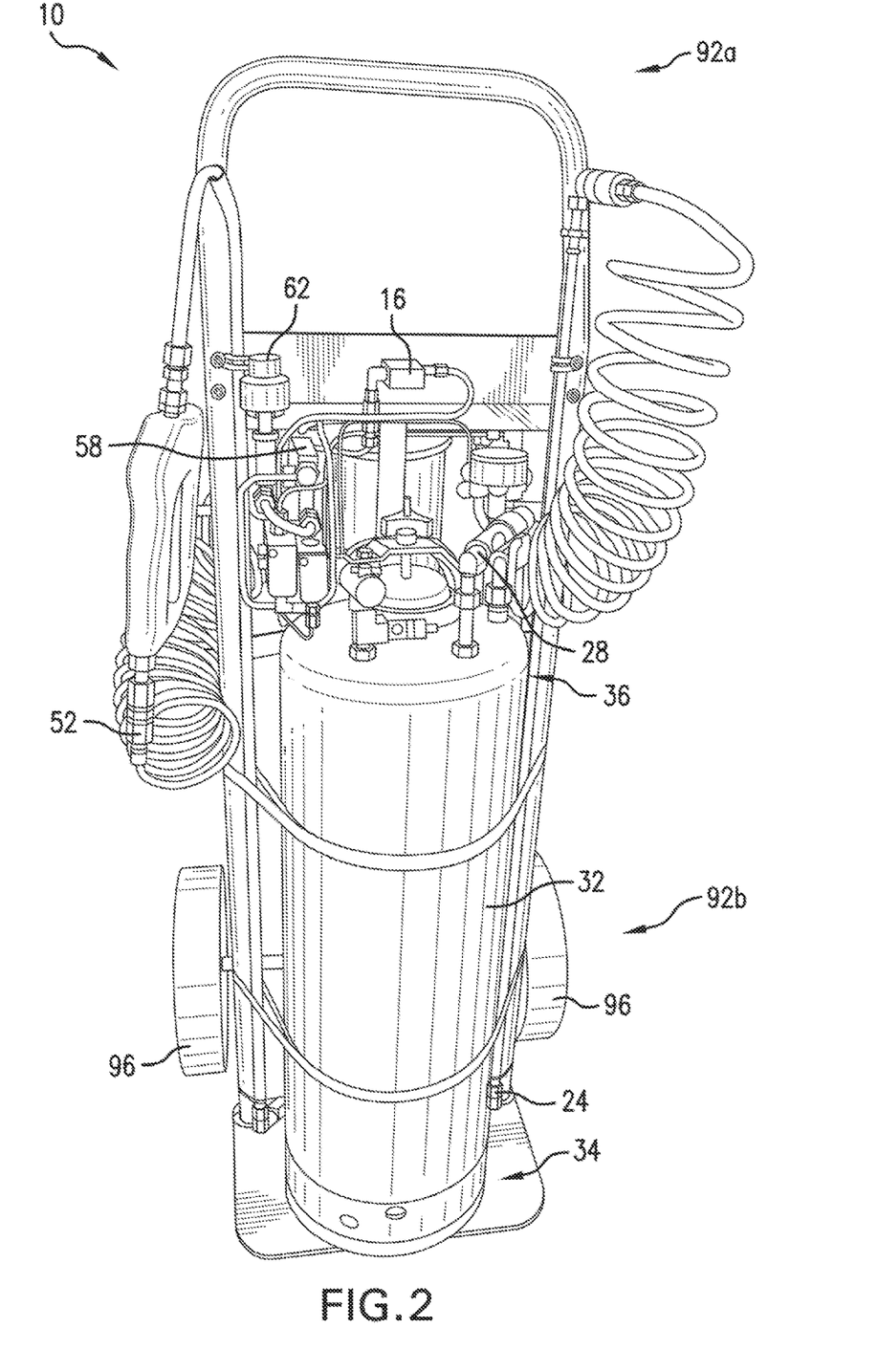
FIG. 2 is a front perspective view of the oil storage and filtration system.
Figure 3:
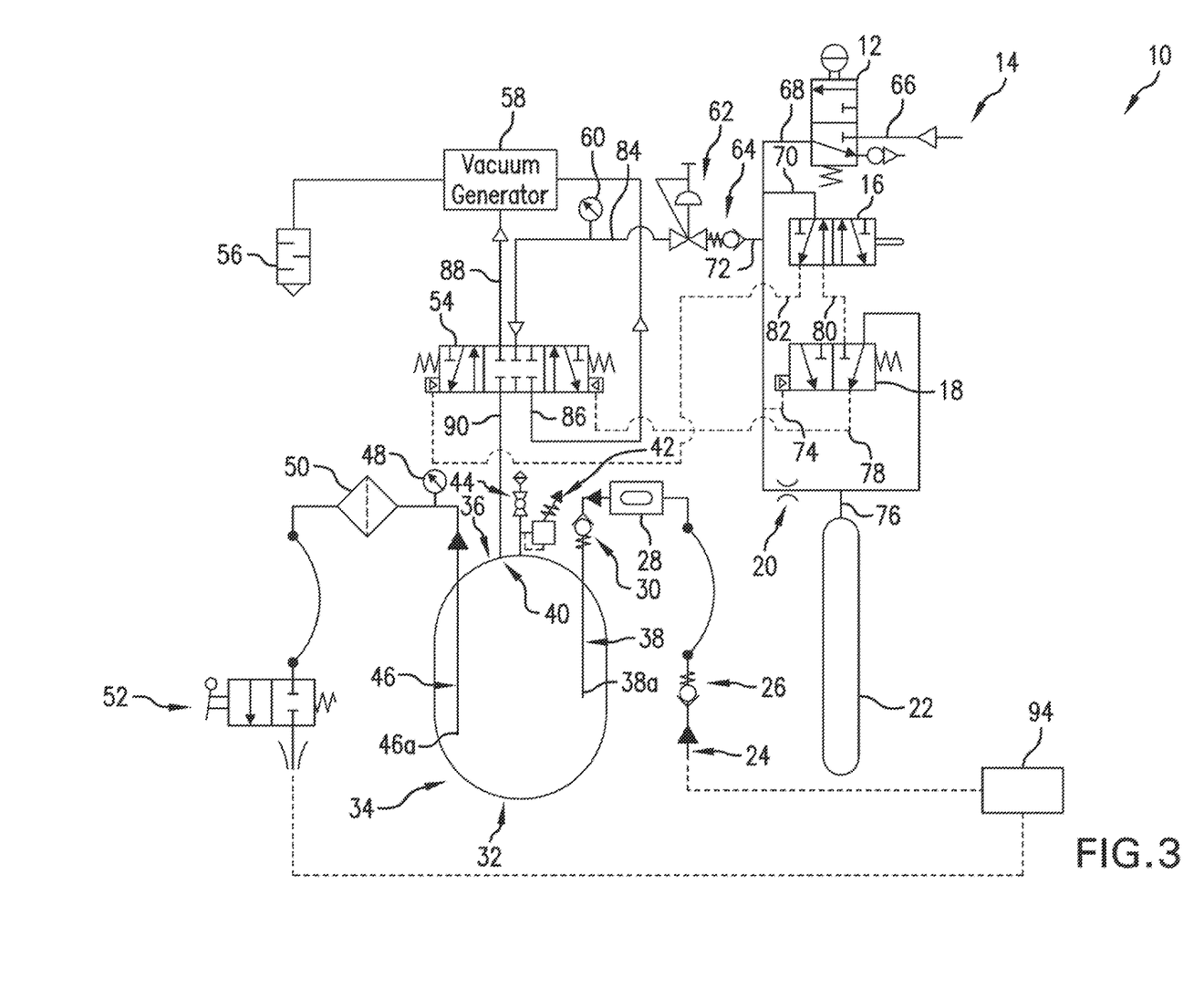
FIG. 3 is a schematic of the oil storage and filtration system.

An oil storage and filtration system 10 is shown in FIGS. 1-3. With specific attention first directed to FIG. 3, a schematic of the oil storage and filtration system 10 that is configured to be detachably connected to an engine unit 94 is shown. It will be appreciated that the term "engine unit" includes "auxiliary power units" (APUs) and that these terms can be used interchangeability without departing from the scope of this disclosure. The oil storage and filtration system 10 can include an on/off valve 12 that receives supply air 14, a fill/drain valve 16, a control valve 18, an orifice 20, and a safety reservoir tank 22. The oil storage and filtration system 10 can also include an oil suction nozzle 24, an oil suction check valve 26, a sight glass 28, a sight glass check valve 30, and a storage tank 32 with a bottom end 34 and a top end 36.

The oil storage and filtration system 10 can also include an intake line 38 with an intake line distal end 38a, an air port 40, a tank pressure relief valve 42, a manual ball valve 44, an exhaust line 46 with an exhaust line distal end 46a, an oil gauge 48, an oil filter 50, and an oil dispensing nozzle 52. The oil storage and filtration system 10 can further include a pressure/vacuum valve 54, a silencer 56, a vacuum generator 58, an air pressure gauge 60, an air pressure regulator 62, and a supply air check valve 64.

As will be appreciated, the below discussion regarding lines, branches, and pilots detail how the supply air 14 is fluidly communicated between the various components. The various lines, branches, and pilots could be made of any number of materials and have a variety of shapes and sizes without departing from the scope of this disclosure. For example, as long as the lines, branches, and pilots communicate the supply air 14 between the components so that the oil storage and filtration system 10 can operate as described hereinafter, it is acceptable.

A first line 66 fluidly connects the supply air 14 and the on/off valve 12. A second line 68 fluidly connects the on/off valve 12 and the control valve 18. A first branch 70 extends from the first line 66 to the fill/drain valve 16 and a second branch 72 extends from the first line 66 to the supply air check valve 64. A first pilot 74 extends from the first line 66 to the control valve 18 and a third branch 76 extends from the first line 66 to the safety reservoir tank 22.

A second pilot 78 fluidly connects the control valve 18 and the pressure/vacuum valve 54 and a third pilot 80 fluidly connects the control valve 18 and the fill/drain valve 16. A fourth pilot 82 fluidly connects the fill/drain valve 16 and the pressure/vacuum valve 54. A fourth branch 84 fluidly connects the air pressure regulator 62 and the pressure/vacuum valve 54 with the air pressure gauge 60 disposed therebetween. A third line 86 and a fourth line 88 each fluidly connect the pressure/vacuum valve 54 and the vacuum generator 58. A fifth line 90 fluidly connects the pressure/vacuum valve 54 and the storage tank 32.

The on/off valve 12 selectively receives the supply air 14 and defines an operating phase when receiving the supply air 14 and in an on position. The on/off valve 12 also defines a standby phase when in an off position or not receiving the supply air 14. It is envisioned that the supply air 14 would be between 100 PSI and 180 PSI and of a typical volume that is supplied in an industrial setting. It is noted that all references to pressure in the present disclosure are of gauge pressure, not absolute pressure. Thus, the above noted pressures would be 100 PSI to 180 PSI greater than atmospheric pressure.

The fill/drain valve 16 receives the supply air 14 from the on/off valve 12 during the operating phase. Further, during the operating phase, the fill/drain valve 16 defines a drain state and a fill state. The air pressure regulator 62 regulates a pressure of the supply air 14 that is provided to the pressure/vacuum valve 54.

The control valve 18 receives air from the first pilot 74 from the on/off valve 12 and the supply air 14 during the operating phase and the pressure/vacuum valve 54 is in fluid communication with the control valve 18. The control valve 18 monitors a pressure of the supply air 14 and is fluidly disposed between the safety reservoir tank 22 or the fill/drain valve 16 and the pressure/vacuum valve 54.

The orifice 20 restricts the air flow from safety reservoir tank 22 when the supply air 14 has dropped to 0 PSI. This allows the control valve 18 to supply air from safety reservoir tank 22 to the pressure/vacuum valve 54 which allows the storage tank 32 to stabilize to 0 PSI or atmospheric condition. The pressure/vacuum valve 54 closes when the safety reservoir tank 22 pressure falls below 40 PSI. Thus, any oil is contained in the storage tank 32 at 0 PSI or atmospheric condition.

The safety reservoir tank 22 is fluidly isolated from the oil and is fluidly connected to the control valve 18. The safety reservoir tank 22 receives the supply air 14 from the on/off valve 12 during the operating phase. The safety reservoir tank 22 can be made of any number of materials and have a variety of shapes without departing from the scope of the disclosure. For example, the safety reservoir tank 22 can have a capacity of 37 cubic inches with a 0.010" orifice and be rated to a pressure of at least 180 PSI. The safety reservoir tank 22 can maintain a pressure of over 40 PSI to the pressure/vacuum valve 54 long enough to allow stabilization of storage tank 32 at 0 PSI or atmospheric condition.

The oil suction check valve 26 prevents oil that may be between the oil suction nozzle 24 and the sight glass 28 from leaking from the oil suction nozzle 24. Further, as a matter of design redundancy, the sight glass check valve 30 prevents oil in the storage tank 32 from exiting through the oil suction nozzle 24.

The sight glass 28 provides a visual indication of a flowing status of the oil. Thus, a user of the oil storage and filtration system 10 can easily ascertain whether oil is being deposited into the storage tank 32. The sight glass 28 is fluidly connected to the storage tank 32 such that the sight glass 28 is fluidly disposed between the oil suction nozzle 24 and the storage tank 32.

The storage tank 32 is in fluid communication with the pressure/vacuum valve 54 and is configured to store oil in three conditions. These conditions are a pressurized condition during the fill state, a vacuum condition during the drain state, and an atmospheric condition during the standby phase. The storage tank 32 includes the top end 36 and the bottom end 34 that are disposed at opposite ends of the storage tank 32. The storage tank 32 can be made of any number of materials and have a variety of shapes without departing from the scope of the disclosure. For example, the storage tank 32 can have any capacity and be rated to a pressure of that is higher than the regulated pressure and 27 inches of Hg (vacuum). For example, these values could be 60 PSI and a vacuum of 27 in. of Hg.

As will be described in more detail hereinafter, the storage tank 32 is utilized as both a vacuum tank and a pressurized tank for emptying and filling the oil from the engine unit 94. Thus, multiple tanks are not needed, thereby reducing the overall size and weight of the oil storage and filtration system 10. As will be appreciated, this also reduces the cost to make the oil storage and filtration system 10.

It should also be understood that the storage tank 32 and the oil storage and filtration system 10 are configured such that the oil in the storage tank 32 remains distinct from the supply air 14 in the storage tank 32. Notably, the presence or absence of the supply air 14 in the storage tank 32 is merely utilized to pressurize or create a vacuum in the storage tank 32 so as to communicate the oil out of or into the storage tank 32, respectively. Any mixing of the oil in the storage tank 32 with the supply air in the storage tank 32 could result in decreased performance of the oil when it is received in the engine unit 94.

The top end 36 of the storage tank 32 defines the air port 40 that, through the fifth line 90, is in fluid communication with the pressure/vacuum valve 54. The air port 40 is positioned such that the oil is not communicated through the air port 40. Thus, the oil does not exit the storage tank 32 through the air port 40 and subsequently through the fifth line 90 and the pressure/vacuum valve 54. This prevents the oil from being released to the environment through the silencer 56. As will be appreciated, it is desirable to prevent said release to minimize environmental impacts and optimize operation of the components of the oil filtration system 10.

The intake line 38 extends into the storage tank 32 to communicate the oil from outside the storage tank 32 into the storage tank 32 and defines an intake line length. The exhaust line 46 extends into the storage tank 32 to communicate the oil from inside the storage tank 32 to outside of the storage tank 32 and defines an exhaust line length.

The intake line 38 includes an intake line distal end 38a and the exhaust line 46 includes an exhaust line distal end 46a. The intake line distal end 38a can be spaced from bottom end 34 and the exhaust line distal end 46a can also be spaced from bottom end 34. This arrangement ensures that a maximum amount of oil can be removed from the storage tank 32 when the engine unit 94 is being filled.

The oil suction nozzle 24 is fluidly connected to the storage tank 32 and is configured to be detachably connected to the engine unit 94. Further, the oil dispensing nozzle 52 is fluidly connected to the storage tank 32 and is configured to be detachably connected to the engine unit 94. As shown in FIGS. 2-3, the oil suction nozzle 24 and the oil dispensing nozzle 52 are configured to allow for rapid attachment and detachment to the engine unit 94.

The tank pressure relief valve 42 is configured to open when an excess pressure is developed in the storage tank 32. Thus, the tank pressure relief valve 42 ensures that an over-pressure situation does not develop in the storage tank 32 to avoid a rupture or splitting of the storage tank 32 by venting any excess supply air 14 that would be in the storage tank 32. Further, the manual ball valve 44 can be utilized to manually vent any supply air 14 that is in the storage tank 32.

The oil gauge 48 can be of typical construction and provides a numerical indication to a user regarding the pressure or vacuum that is existing in the storage tank 32 to the oil filter 50. The oil filter 50 fitters the oil and is fluidly connected to the storage tank 32 such that the oil fitter 50 is fluidly disposed between the oil dispensing nozzle 52 and the storage tank 32. The oil filter 50 is configured to remove a variety of contaminants and foreign bodies from the oil. The oil filter 50 may be made of a variety of materials and have a variety of shapes without departing from the scope of this disclosure. The oil filter 50 may be removably attached so as to provide easy replacement when no longer serviceable.

The pressure/vacuum valve 54 is fluidly connected to the on/off valve 12 such that the air pressure regulator 62 is disposed therebetween. The pressure/vacuum valve 54 controls whether the supply air 14 is utilized to operate the vacuum generator 58 to generate a vacuum to communicate the oil from the engine unit 94 into the storage tank 32 or to prevent the supply air 14 from being communicated to the vacuum generator 58 so that no vacuum is generated.

Additionally, the pressure/vacuum valve 54 can divert the supply air 14 to the storage tank 32 to communicate the oil from the storage tank 32 to the engine unit 94.

The silencer 56 is configured to reduce a noise caused by a discharge of the supply air 14 from the oil storage and filtration system 10. The silencer 56 is fluidly connected to the vacuum generator 58. Further, the silencer 56 is a terminus for flow of the supply air 14. The silencer 56 can be of a variety of types of construction without departing from the scope of the disclosure.

The vacuum generator 58 utilizes the supply air 14 to generate vacuum which is selectively communicated to the storage tank 32. The vacuum generator 58 utilizes a venturi to generate the vacuum, as is known in the art. The vacuum generator 58 is in selective fluid communication with the control valve 18 (via the pressure/vacuum valve 54) and is in fluid communication with the storage tank 32 during the drain state and fluidly isolated from the storage tank 32 during the fill state. Additionally, the vacuum generator 58 is fluidly disposed between the silencer 56 and the pressure/vacuum valve 54.

With reference to FIGS. 1-2, the oil storage and filtration system 10 is shown. The oil storage and filtration system 10 can include a frame 92 to which the safety reservoir tank 22 and the storage tank 32 are attached. The frame 92 can be made of a variety of materials. The frame 92 includes an upper end 92a and a lower end 92b that are disposed at opposite vertical ends of the frame 92 to one another. The upper end 92a is configured to be contacted by a user to move the oil storage and filtration system 10. As will be appreciated, it is desirable to be able to move the oil storage and filtration system 10 to different locations, depending upon the location of the engine unit 94. The lower end 92b of the frame 92 is configured to be connected to at least one wheel 96 to aid in moving the oil storage and filtration system 10.

Figure 4:
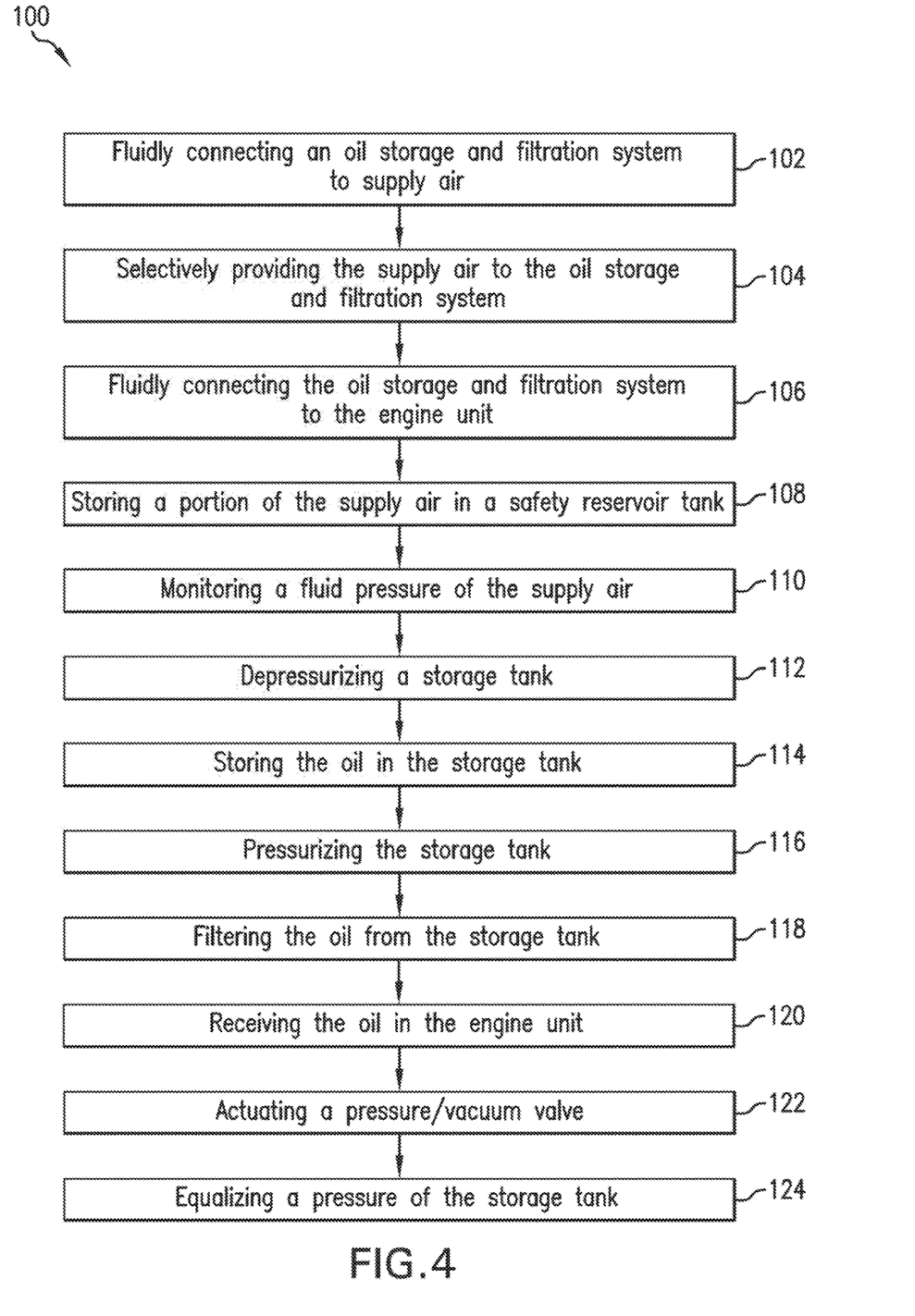
FIG. 4 is a flowchart illustrating a method of processing oil from the engine unit.

With reference to FIG. 4, a method 100 of processing oil from an engine unit 94 is shown. At 102, an oil storage and filtration system 10 is fluidly connected to supply air 14. At 104, the supply air 14 is selectively provided to the oil storage and filtration system 10. At 106, the oil storage and filtration system 10 is fluidly connected to the engine unit 94. At 108, a portion of the supply air 14 is stored in the safety reservoir tank 22. At 110, a fluid pressure of the supply air 14 is monitored. At 112, the storage tank 32 is depressurized, and at 114 the oil is stored in the storage tank 32. At 116, the storage tank 32 is pressurized. At 118, the oil from the storage tank 32 is filtered. At 120, the oil is received in the engine unit 94. At 122, a pressure/vacuum valve 54 is actuated with the portion of the supply air 14 from the safety reservoir tank 22. This actuation occurs when the monitored fluid pressure of the supply air 14 is less than a predetermined value, for example 40 PSI or when the monitored fluid pressure of the supply air 14 is equal to zero, i.e., the absolute pressure of the supply air 14 is equal to atmospheric pressure. At 124, a pressure of the storage tank 32 is equalized to atmospheric pressure due to actuation of the pressure/vacuum valve 54.

Operation of the oil storage and filtration system 10 to drain the oil from the engine unit 94 will now be described. The supply air 14 is connected to the on/off valve 12. Further, the fill/drain valve 16 is set to the drain position and the on/off valve 12 is set to the on position. This allows the supply air 14 to go to the fill/drain valve 16 and the supply air check valve 64 that goes to the air pressure regulator 62. The supply air 14 is also communicated to a pilot valve on the control valve 18 and the orifice 20 and fills the safety reservoir tank 22.

Supply air 14 in the first pilot 74 moves the control valve 18 to the operating position. This allows the supply air 14, which could be approximately 100 PSI, to be communicated to the fill/drain valve 16 and through the control valve 18 to a pilot of the pressure/vacuum valve 54.

The pressure/vacuum valve 54 is then moved into the vacuum position since the fill/drain valve 16 is in the drain position. Thus, the supply air 14 is communicated through the air pressure regulator 62, into the pressure/vacuum valve 54 and is diverted through the third line 86 that goes to the vacuum generator 58. The pressure/vacuum valve 54 is also open to the storage tank 32 which allows a vacuum to be created from the vacuum generator 58 to suck out of the storage tank 32. Thus, the suction and the pressure are both exiting the oil storage and filtration system 10 through the silencer 56.

This results in oil being removed from the engine unit 94 and into the oil storage and filtration system 10. The oil from the engine unit 94 is communicated through the oil suction check valve 26 and can travel through a hose or other communicative means through the sight glass 28 and then through the sight glass check valve 30. The oil then passes through the distal end 38a of the intake line 38 and into the storage tank 32. At the top end 36 of the storage tank 32, there can be the tank pressure relief valve 42 and the manual ball valve 44. The manual ball valve 44 can be used to verify that the storage tank 32 is empty and the gauge 48 can also be used to verify that the storage tank 32 has no pressure or vacuum.

If the on/off valve 12 is moved to off or if the supply air 14 is disconnected, or if the supply air 14 drops below a predetermined pressure, the on/off valve 12 automatically moves to the off position. The predetermined pressure could be approximately 40 PSI. This opens an exit port on the on/off valve 12 which relieves all the pressure of the lines.

The supply air check valve 64 maintains pressure on the tank side of the air pressure regulator 62, but that pressure is already exiting through the vacuum generator 58. The pressure/vacuum valve 54 is held open by the air from the safety reservoir tank 22 so when the pressured air is released through the on/off valve 12, the control valve 18 automatically springs to divert the air from the safety reservoir tank 22 over to the pilot line that holds the pressure/vacuum valve 54 in the vacuum position. This allows all the vacuum to leave the storage tank 32 and reach an equilibrium of atmospheric pressure in the storage tank 32.

Now, operation of the oil storage and filtration system 10 to transfer the oil from the storage tank 32 to the engine unit 94 will now be described. The supply air 14 is connected to the on/off valve 12. Further, the fill/drain valve 16 is set to the fill position and the on/off valve 12 is set to the on position. This allows the supply air 14 to go to the fill/drain valve 16 and the supply air check valve 64 that goes to the air pressure regulator 62. The supply air 14 is also communicated to a pilot valve on the control valve 18 and the orifice 20 and fills the safety reservoir tank 22.

When there is sufficient pressure, typically at least 40 PSI, the control valve 18 moves to the operating position. The pressure/vacuum valve 54 is closed, but when the on/off valve 12 is set to the on position, it is energized. The supply air 14 goes through the fill/drain valve 16 that is in the fill position, and the pilot on the pressure/vacuum valve 54 is actuated, which pushes the pressure/vacuum valve 54 into the pressurized position.

This allows the supply air 14 to go from the air pressure regulator 62 into the storage tank 32 and the supply air 14 is isolated from the vacuum generator 58. As such, air pressure in the storage tank 32, which can be approximately 40 to 60 PSI, forces the oil out of the storage tank 32, by the oil gauge 48 and through the oil filter 50. Then, the filtered oil from the storage tank 32 passes through the oil dispensing nozzle 52 into the engine unit 94.

If the on/off valve 12 is moved to off or if the supply air 14 is disconnected, or if the supply air 14 drops below a predetermined pressure, the on/off valve 12 automatically moves to the off position. The predetermined pressure could be approximately 40 PSI. This opens an exit port on the on/off valve 12 which relieves all the pressure of the lines. The control valve 18 will spring back to the safety position and air from the safety reservoir tank 22 will actuate the pressure/vacuum valve 54 back into the vacuum position to get rid of any pressurized air in the storage tank 32.

When the pressure/vacuum valve 54 is in the vacuum position, the air pressure in the storage tank 32 blows through the vacuum generator 58 and out the silencer 56. Then, the oil storage and filtration system 10 is normalized to atmospheric pressure and the safety reservoir tank 22 is empty (i.e., the air in the safety reservoir tank 22 is communicated through the orifice 20 to the on/off valve 12). Once the air is out of the safety reservoir tank 22, the pressure/vacuum valve 54 returns to the closed position and there is a closed system with no pressure or vacuum. Stated plainly, all components and lines, branches, and pilots are at atmospheric pressure. This automatic release of all of the stored energy (pressure or vacuum) greatly enhances safe operation of the oil storage and filtration system 10, while still preventing the release of the oil into the environment.

The oil storage and filtration system 10 and the method 100 of processing oil from an engine unit 94 provide numerous advantages. These advantages include the ability to reuse the oil utilized during engine unit testing for an indefinite period of time. This avoids the cost of purchasing additional oil and also the subsequent costs associated with disposal of the oil. Further, other than the supply air 14, no external electrical power, pumps or drive systems are needed. Further, the oil storage and filtration system 10 is self-regulated and includes safety devices to prevent overpressure and oil leaks. Additionally, the oil storage and filtration system 10 is portable.

An oil storage and filtration system and a method of processing oil from an engine unit have been described above with particularity. Modifications and alterations will occur to those upon reading and understanding the preceding detailed description. The invention, however, is not limited to only the embodiments described above. Instead, the invention is broadly defined by the appended claims and the equivalents thereof.

The invention claimed is:

1. A method of processing oil from an auxillary power unit, the method comprising:
fluidly connecting an oil storage and filtration system to supply air;
selectively providing the supply air to the oil storage and filtration system;
fluidly connecting the oil storage and filtration system to the auxiliary power unit so that the oil storage and filtration system is selectively removable from the auxiliary power unit;
depressurizing a storage tank of the oil storage and filtration system to transfer the oil from the auxiliary power unit to the storage tank through a storage tank intake line;
storing the oil in the storage tank of the oil storage and filtration system;
pressurizing the storage tank of the oil storage and filtration system to transfer the oil from the storage tank through a storage tank exhaust line to the auxiliary power unit;
storing a portion of the supply air in a safety reservoir tank of the oil storage and filtration system, wherein the safety reservoir tank is fluidly isolated from the oil;
monitoring a fluid pressure of the supply air;
actuating a pressure/vacuum valve of the oil storage and filtration system with the portion of the supply air from the safety reservoir tank when the monitored fluid pressure of the supply air is equal to zero; and
equalizing an internal pressure of the storage tank to atmospheric pressure when the pressure/vacuum valve is actuated due to the monitored fluid pressure of the supply air being zero.

2. The method of claim 1, further comprising:
filtering the oil from the storage tank before the oil is received in the auxiliary power unit.

3. The method of claim 1, wherein the storage tank is fluidly connected to the pressure/vacuum valve through an air port of the storage tank, and wherein the oil does not exit the storage tank through the air port.

4. A method of processing oil from an auxiliary power unit, the method comprising:
fluidly connecting an oil storage and filtration system to supply air;
selectively providing the supply air to the oil storage and filtration system;
fluidly connecting the oil storage and filtration system to the auxiliary power unit so that the oil storage and filtration system is selectively removable from the auxillary power unit;
depressurizing a storage tank of the oil storage and filtration system to transfer the oil from the auxiliary power unit to the storage tank through a storage tank intake line;
storing the oil in the storage tank of the oil storage and filtration system;
pressurizing the storage tank of the oil storage and filtration system to transfer the oil from the storage tank through a storage tank exhaust line to the auxiliary power unit;

storing a portion of the supply air in a safety reservoir tank of the oil storage and filtration system, wherein the safety reservoir tank is fluidly isolated from the oil;

monitoring a fluid pressure of the supply air;

actuating a pressure/vacuum valve of the oil storage and filtration system with the portion of the supply air from the safety reservoir tank when the monitored fluid pressure of the supply air is less than a predetermined value; and equalizing an internal pressure of the storage tank to atmospheric pressure when the pressure/vacuum valve is actuated due to the monitored fluid pressure of the supply air being less than a predetermined value.

5. The method of claim 4, wherein the storage tank is fluidly connected to the pressure/vacuum valve through an air port of the storage tank, and wherein the oil does not exit the storage tank through the air port.

6. The method of claim 4, further comprising:

filtering the oil from the storage tank before the oil is received in the auxiliary power unit.

* * * * *